United States Patent
White et al.

(10) Patent No.: US 9,887,958 B2
(45) Date of Patent: Feb. 6, 2018

(54) CONFIGURING DNS CLIENTS

(71) Applicant: Netflix, Inc., Los Gatos, CA (US)

(72) Inventors: Jean-Marie White, San Jose, CA (US); Benbuck Nason, Castro Valley, CA (US)

(73) Assignee: NETFLIX, INC., Los Gatos, CA (US)

( * ) Notice: Subject to any disclaimer, the term of this patent is extended or adjusted under 35 U.S.C. 154(b) by 254 days.

(21) Appl. No.: 14/027,863

(22) Filed: Sep. 16, 2013

(65) Prior Publication Data

US 2015/0081926 A1  Mar. 19, 2015

(51) Int. Cl.
*G06F 15/16* (2006.01)
*H04L 29/12* (2006.01)
*H04L 29/08* (2006.01)
*H04L 12/803* (2013.01)

(52) U.S. Cl.
CPC ...... *H04L 61/2007* (2013.01); *H04L 61/1511* (2013.01); *H04L 67/1008* (2013.01); *H04L 67/1036* (2013.01); *H04L 47/122* (2013.01); *H04L 47/125* (2013.01); *H04L 61/6009* (2013.01)

(58) Field of Classification Search
None
See application file for complete search history.

(56) References Cited

U.S. PATENT DOCUMENTS

| 6,754,706 | B1 * | 6/2004 | Swildens | H04L 29/06 709/219 |
| 6,920,498 | B1 * | 7/2005 | Gourlay | H04L 67/1008 709/200 |
| 7,653,700 | B1 * | 1/2010 | Bahl | H04L 12/2602 709/216 |
| 7,680,876 | B1 * | 3/2010 | Cioli | G06F 11/1662 709/201 |

(Continued)

OTHER PUBLICATIONS

Sekiya et al., "Research of Method for DNS Performance Measurement and Evaluation Based on Benchmark DNS Servers", vol. J87-B No. 10, dated Oct. 2004, 10 pages.

(Continued)

*Primary Examiner* — Viet Vu
*Assistant Examiner* — James Edwards
(74) *Attorney, Agent, or Firm* — Artegis Law Group, LLP

(57) ABSTRACT

Techniques are provided for increasing the efficiency and efficacy of DNS clients. In one technique, DNS clients log information about performance of one or more DNS servers that the DNS clients use to resolve DNS resolution requests. The DNS clients send, to a control server, performance data regarding the DNS resolution requests and/or subsequent connections to servers associated with resolved domain names. Based on the performance data, the control server sends, to one or more DNS clients, configuration data that adjusts the configuration of the DNS clients. For example, if a particular DNS server is taking a considerable amount of time to resolve DNS resolution requests from one or more (Continued)

DNS clients, then the control server may send, to a plurality of DNS clients, configuration data that indicates a different set of one or more DNS servers for the plurality of DNS clients to contact for subsequent DNS resolution requests.

32 Claims, 3 Drawing Sheets

(56) References Cited

U.S. PATENT DOCUMENTS

| | | | | |
|---|---|---|---|---|
| 7,734,683 | B1* | 6/2010 | Bergenwall | H04L 29/12066 709/203 |
| 7,953,830 | B2* | 5/2011 | Foster | H04L 29/12273 370/389 |
| 8,468,247 | B1* | 6/2013 | Richardson | H04L 67/18 370/329 |
| 8,566,928 | B2* | 10/2013 | Dagon | H04L 29/12066 726/22 |
| 8,819,209 | B1* | 8/2014 | Chen | H04L 61/1511 709/223 |
| 9,391,949 | B1* | 7/2016 | Richardson | H04L 61/1511 |
| 2003/0172145 | A1* | 9/2003 | Nguyen | G06Q 10/10 709/223 |
| 2005/0015471 | A1* | 1/2005 | Zhang | H04L 63/0442 709/221 |
| 2006/0116988 | A1* | 6/2006 | Toebes | H04L 67/1021 |
| 2006/0129665 | A1* | 6/2006 | Toebes | H04L 29/12066 709/223 |
| 2008/0098084 | A1* | 4/2008 | Volz | H04L 29/12066 709/217 |
| 2008/0222275 | A1* | 9/2008 | Yumoto | H04L 12/433 709/220 |
| 2010/0125675 | A1* | 5/2010 | Richardson | H04L 29/12066 709/242 |
| 2011/0010463 | A1* | 1/2011 | Christenson | H04L 29/12066 709/245 |
| 2011/0191455 | A1* | 8/2011 | Gardner | H04L 29/12066 709/223 |
| 2012/0179814 | A1* | 7/2012 | Swildens | H04L 12/14 709/224 |
| 2013/0297596 | A1* | 11/2013 | Mouline | G06F 17/30241 707/724 |
| 2013/0332586 | A1* | 12/2013 | Masputra | H04L 69/167 709/220 |
| 2014/0172944 | A1* | 6/2014 | Newton | H04L 67/289 709/202 |
| 2014/0337472 | A1* | 11/2014 | Newton | H04L 67/32 709/217 |

OTHER PUBLICATIONS

European Patent Office, "Search Report" in application No. 14184823.4-1505, dated Mar. 26, 2015, 6 pages.

Claims in European Application No. 14184823.4-1505, dated Mar. 2015, 4 pages.

Sekiya et al., "Research of Method for DNS Performance Measurement and Evaluation Based on Benchmark DNS Servers", vol. 89, No. 10, dated Oct. 1, 2006, 10 pages.

European Claims in application No. 14184823.4-1505, dated Mar. 2015, 4 pages.

Readme.txt, "Namebench", Open-Source DNS Benchmark Utlity, dated Mar. 19, 2015, https://web.archive.org/web/20120106145825, 4 pages.

European Patent Office, "Search Report" in application No. 14184823.4-1505, dated Jul. 20, 2015, 10 pages.

Claims in European Application No. 14184823.4-1505, dated Jul. 2015, 4 pages.

* cited by examiner

CONFIGURING DNS CLIENTS

FIELD OF THE DISCLOSURE

The present disclosure generally relates to computers that implement the Domain Name System (DNS) and, more specifically, to improving DNS client computer performance.

BACKGROUND

DNS is a protocol within a set of standards relating to how computers exchange data on the Internet and on many private networks. The set of standards is known as the TCP/IP protocol suite. A purpose of DNS is to transform a text-based domain name (for example, "www.cnn.com") into an Internet Protocol (IP) address (for example, 122.4.25.83) that computers use to identify each other on the network.

A DNS client executing on a client device is responsible for sending a DNS resolution request that ultimately leads to a full resolution (translation) of a resource sought, for example, translation of a domain name into a set of IP address(es). After an IP address is identified for a domain name, that IP address may be used for a certain period of time without requiring the DNS client to issue another DNS resolution request to resolve that domain name. However, in many situations, that period of time in which a resolution is valid or "alive" (referred to as "time to live" or TTL) is a minute or less. As a result the DNS client must issue another DNS resolution request when an application requests the IP address at a time more than a minute later. The TTL for an IP address may be established by the entity that controls the hostname, such as an authoritative server. The TTL may be relatively small to allow for more effective load balancing among multiple servers that each provide a particular service but have different IP addresses.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for increasing the efficiency of DNS clients. According to one technique, DNS clients create and store logs of information about performance of one or more DNS servers that the DNS clients use to resolve DNS resolution requests. The DNS clients send, to a control server, performance data regarding the DNS resolution requests. Based on the performance data, the control server sends, to one or more DNS clients, configuration data that adjusts the configuration of the DNS clients. For example, if a particular DNS server is taking a considerable amount of time to resolve DNS resolution requests from one or more DNS clients, then the control server may send, to a plurality of DNS clients, configuration data that indicates a different set of one or more DNS servers for the plurality of DNS clients to contact for subsequent DNS resolution requests.

According to another technique, a DNS client, upon start-up of a certain application, sends one or more DNS resolution requests to one or more DNS servers without waiting for any input from a user. In this way, the DNS client has access to IP addresses before a user desires to view content from servers associated with any of the IP addresses. Thus, the set of IP addresses that are pre-fetched in this way are ones that the user is likely to need soon.

According to another technique, a DNS client automatically refreshes a cache of resolved hostnames. The cache includes one or more entries, each corresponding to a different hostname and set of IP addresses. In response to detecting that a cache entry is about to expire, the DNS client sends a DNS resolution request for that hostname to one or more DNS servers.

According to another technique, a DNS client sends multiple DNS resolution requests for the same hostname to multiple DNS servers before any of the DNS servers respond. In this way, a DNS client may resolve a hostname faster than if the DNS client serially sent a DNS resolution request to multiple DNS servers where the first DNS server ends up being slow to respond.

According to another technique, a DNS client automatically uses a set of fallback DNS servers in case an initial set of one or more DNS servers are performing poorly. Identification of the set of fallback DNS servers may be received from a control server or may be pre-configured in the DNS client.

Example Networked Computer Architecture

Figure 1:
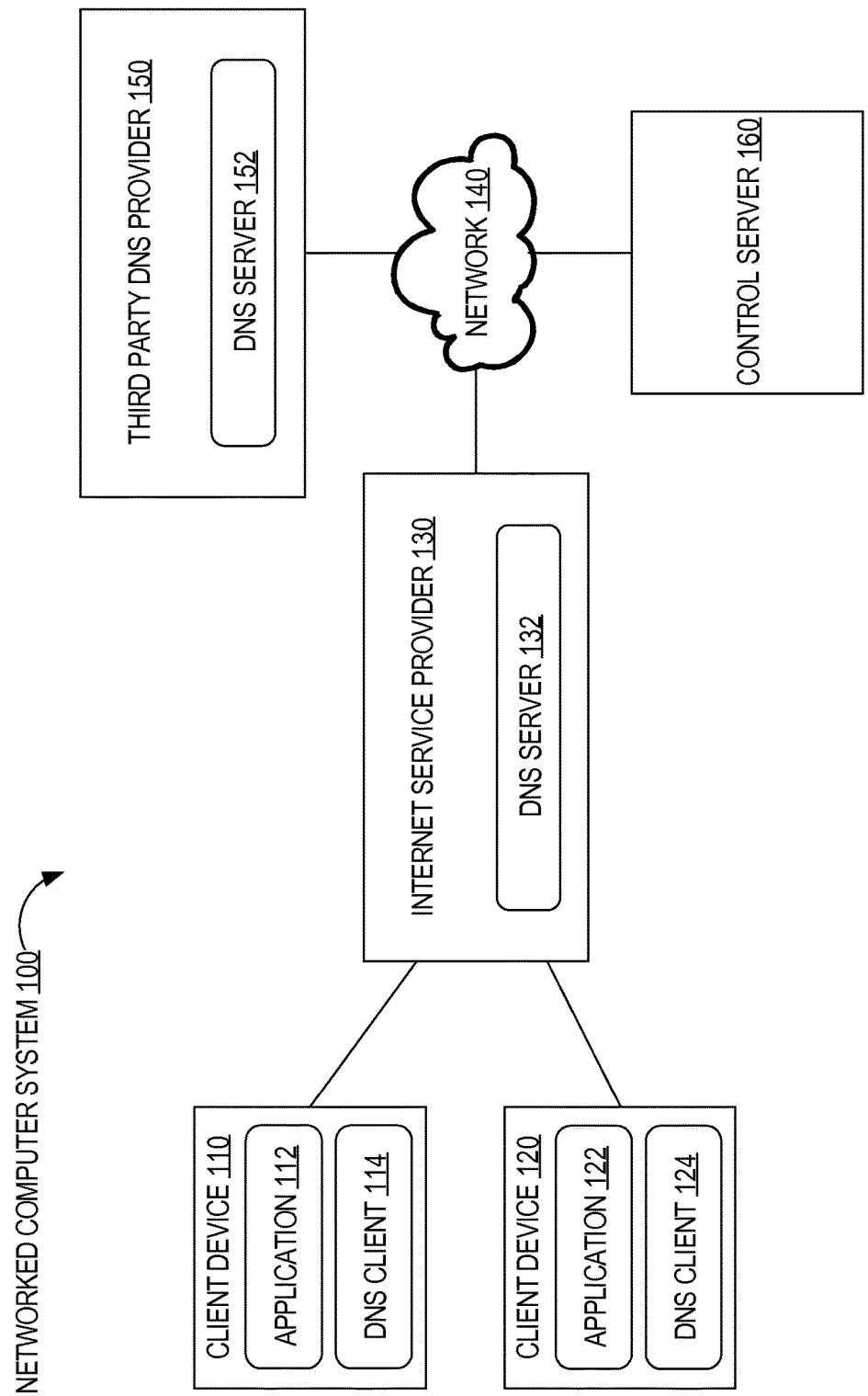
FIG. 1 illustrates a networked computer system in which an embodiment may be used.

FIG. 1 illustrates an example networked computer system 100 in which an embodiment may be used. System 100 includes client devices 110 and 120, an Internet service provider (ISP) 130, a network 140, a third party DNS provider 150, and a control server 160.

Although only two client devices are depicted for purposes of illustrating a clear example, networked computer system 100 may include many client devices, each of which may communicate with control server 160.

Client device 110 is a computing device that hosts or executes an application 112 and a DNS client 114. Examples of client device 110 include a laptop computer, a desktop computer, a tablet computer, a smartphone, a set-top box, and a video game console. Client device 110 includes one or more processors, volatile memory, and non-volatile memory for persistently storing data.

Application 112 may be a web browser or another application that performs a set of functions that do not include browsing the "Web." Although only one application is depicted, client device 110 may include multiple applications.

Although depicted as separate from application 112, DNS client 114 may be a component of application 112.

DNS client 114 is configured to communicate with one or more DNS servers to retrieve IP addresses for requested domain names. The one or more DNS servers may include DNS server 132 in ISP 130 and/or DNS server 152 in third party DNS provider 150, which is separate from ISP 130.

Although only a single DNS server 132 is depicted in ISP 130, ISP 130 may include multiple DNS servers. Similarly, although only a single DNS server 152 is depicted in third party DNS provider 150, third party DNS provider 150 may include multiple DNS servers.

DNS client 114 sends a DNS resolution request to a DNS server, which determines (either directly or indirectly through one or more other DNS servers) an IP address for a domain name indicated in the DNS resolution request. The DNS server sends, to DNS client 114, a DNS response that indicates the one or more IP addresses, a TTL for each IP address, and a CNAME. The process of sending a DNS resolution request and receiving a DNS response is referred to herein as a "DNS lookup."

Client device 120 is similar to client device 110. Client device 120 includes an application 122 and a DNS client 124. However, client device 120 may be a different type of device than client device 110. Similarly, application 122 may be a different type of application than application 112.

The set of DNS servers that DNS client 114 initially uses to perform DNS lookups may be established based on configuration data, a remote provisioning server computer, user input and/or automatically using the Dynamic Host Configuration Protocol (DHCP). DHCP is a network protocol that is used to configure devices that are connected to a network to enable the devices to communicate on that network using the Internet Protocol (IP). DHCP involves clients and a server operating in a client-server model. One common example of DHCP use is in a local area network (LAN). In a residential gateway example, the server is a router while the clients are hosts (for example personal computers, smart phones, or printers). The router receives the configuration information through a modem from an internet service provider (for example, ISP 130), which also operates DHCP servers with this router as one of the clients. Using the DHCP protocol, the clients request configuration settings, such as an IP address (for a host) and one or more DNS server addresses. Once the client implements these settings, the host is able to communicate on that internet.

DNS client 114 initiates a DNS lookup in response to a request for an IP address from application 112. Application 112 sends a domain name to DNS client 114, which is responsible for sending a corresponding IP address to application 112 when DNS client 114 receives the IP address in a DNS response from a DNS server.

As noted above, DNS client 114 may send DNS resolution requests to DNS server 132 in ISP 130 and/or to DNS server 152, which is outside of ISP 130. Initially, DNS client 114 discovers DNS server 132 in ISP 130 and stores server identification data that identifies DNS server 132 for later use when initiating DNS lookups. Later, DNS client 114 may discover DNS server 152, either based on user input that identifies DNS server 152 or based on input received from control server 160 (which is described in more detail below).

Network 140 may be implemented by any medium or mechanism that provides for the exchange of data between client devices 110 and 120 and DNS server 152 and between client devices 110 and 120 and control server 160. Examples of network 140 include, without limitation, a network such as a Local Area Network (LAN), Wide Area Network (WAN), Ethernet or the Internet, or one or more terrestrial, satellite or wireless links.

Client Logging

In an embodiment, DNS client 114 creates and stores logs comprising data regarding the performance of one or more DNS servers (such as DNS server 132 and DNS server 152). DNS client 114 may analyze the logged data to generate statistics with respect to individual DNS servers and/or multiple DNS servers to which the DNS client has sent DNS resolution requests. For example, DNS client 114 may store separate statistics for each DNS server of DNS server 132 and store aggregated statistics for the set of DNS server 132 and for DNS server 152.

Example data that a DNS client may log includes the time at which the DNS client sent a DNS resolution request to a particular DNS server (hereinafter "query time"), the time at which the DNS client receives, from the particular DNS server, a response to the DNS resolution request (hereinafter "response time"), a number of DNS lookups with respect to a particular DNS server that were successful (hereinafter "successful lookups"), a number of DNS lookups with respect to a particular DNS server that failed (hereinafter "failed lookups" or "DNS timeouts"), a number of times an attempt to establish a connection to a server having an IP address that was discovered by a particular DNS server (hereinafter "target server timeouts"), and/or a time latency to establish a connection to servers having IP addresses that were discovered by a particular DNS server (hereinafter "target server latency"). Additionally, a DNS client may log IP addresses, TTL, and CNAMEs, which may be analyzed to determine which DNS servers give the best results, including geographic location of target servers. Thus, a particular DNS server that is providing IP addresses of servers that are geographically further (and thus, take longer to establish a connection) relative to available servers that are able to respond to requests from application 112 may be discovered and blacklisted, at least with respect to certain DNS clients, such as DNS client 114.

With respect to query time and response time, DNS client 114 may subtract the query time from the response time to determine a latency for a particular DNS lookup with respect to a particular DNS server. After determining a number of latency times for the particular DNS server, DNS client 114 may determine an average latency time for the particular DNS server.

Similarly, the number of failed lookups and the number of successful lookups may be aggregated for a particular group of DNS servers. For example, the number of failed lookups of one server in DNS server 152 and the number of failed lookups of another server in DNS server 152 are added to result in a total number of failed lookups for DNS server 152.

DNS client 114 may store statistics over different periods of time. For example, DNS client 114 may store "lifetime" statistics for the entire time since DNS client 114 was first initialized on client device 110. As another example, DNS client 114 may store weekly statistics that span the last seven days. Statistics, within the weekly statistics, that become "older" than seven days are removed from the weekly statistics. As another example, DNS client 114 may store statistics for DNS lookups that occurred between the hours of 5 PM and 8 PM on weekdays.

In an embodiment, DNS client 114 aggregates statistics based on one or more criteria. The one or more criteria may be time-based criteria. For example, DNS client 114 may aggregate statistics over the "lifetime" of DNS client 114. As another example, DNS client 114 may aggregate statistics over the last week and/or last 24 hours.

The one or more criteria may be DNS server-based criteria. For example, DNS client 114 may aggregate statistics for a particular DNS server, either for all DNS lookups with that particular DNS server or for DNS lookups with that particular DNS server over a certain period of time. Average latency is an example of aggregated statistics for a particular DNS server. Similarly, DNS client 114 may aggregate statistics for a group of DNS servers. For example, average latency may be determined for a group consisting of DNS server 132.

Another example of criteria on which statistics may be based is session-level-based criteria. A session is a period of time that a user is actively using application 112 (or logged in with application 112) or that application 112 is executing continuously. Thus, aggregated statistics may indicate, for a particular session, a number of successful lookups, a number of failed lookups, average latency of DNS lookups, a number of target server timeouts, or a number of times a fallback DNS server was used.

While the above examples involve DNS client 114 analyzing logged data, generating statistics, and aggregating statistics, one or more of these activities may be performed by control server 160. In this way, DNS client 114 may be considered a "dumb" client.

Configuring a DNS Client

In an embodiment, DNS client 114 is configured by a user at a client device that executes the DNS client where the user configures which DNS servers to contact. Additionally or alternatively, DNS client 114 is configured by an operating system (OS) of the client device, which configuration may include not only which DNS servers to contact, but also how long a cache entry that indicates a domain name resolution should be maintained, whether and when to retry a DNS server when the DNS server has not responded, and/or whether and when to query another DNS server when a first DNS server has not responded. The configuration that a DNS client has when the DNS client is installed is referred to herein as the "default configuration."Identities of one or more DNS servers may not be retrieved and stored by a DNS client until after the client device connects to an ISP for the first time. Nevertheless, such identities may be considered part of the DNS client's default configuration.

In an embodiment, control server 160, which is remote relative to DNS client 114, sends configurations instructions to DNS client 114 to configure one or more parameters that dictate how DNS client 114 functions. The parameters that are part of the default configuration may be subject to change based on configuration instructions from control server 160.

Thus, control server 160 is configured to communicate with DNS client 114 and other DNS clients executing on other client devices (not depicted). Control server 160 may be implemented on a single computing device or may be distributed among multiple computing devices that act together to provide a service to DNS clients. Alternatively, different instances of control server 160 may be implemented on different computing devices, each instance providing the same service to DNS clients. In such a scenario, the different instances may have access to the same database of information that is used to configure DNS clients.

Control server 160 may be provided by the same entity that provides client device 110 and other client devices (not depicted) that include a DNS client from which the control server 160 receives performance data.

Control server 160 may use programmed software, special-purpose computers, or other logic to implement operations described herein.

Figure 2:
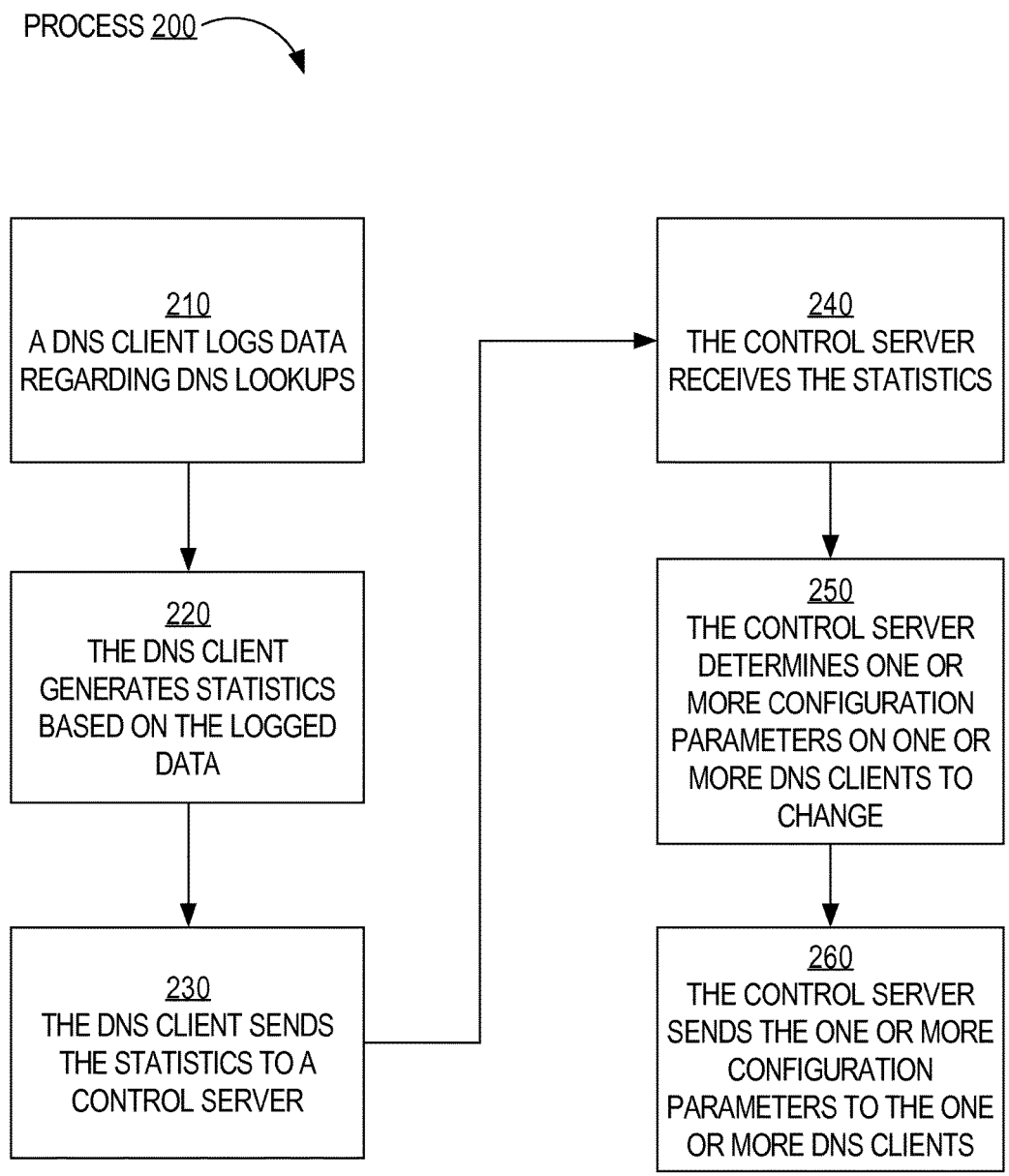
FIG. 2 is a flow diagram that depicts a process for control server interacting with a DNS client, in an embodiment.

FIG. 2 is a flow diagram that depicts a process for control server 160 interacting with DNS client 114, in an embodiment. At block 210, DNS client 114 logs data regarding DNS lookups with respect to one or more DNS servers, such as DNS server 132.

At block 220, DNS client 114 generates statistics based on the logged data. For example, DNS client 114 calculates a total number of failed lookups, a total number of target server timeouts, or an average latency with respect to a particular DNS server.

At block 230, DNS client 114 sends the statistics to control server 160. Block 230 may be performed periodically (such as at the end of each day) or in response to certain events, such as (a) a number of failed lookups with respect to a particular DNS server or set of DNS servers or (b) the average latency with respect to a particular DNS server exceeding a particular threshold. Additionally or alternatively, block 230 may be performed in response to receiving, from control server 160, a request for statistics. The request may be for all statistics maintained by DNS client 114 or for a certain category or set of statistics maintained by DNS client 114. For example, control server 160 may request average latency statistics for each individual DNS server with which DNS client 114 has interacted for DNS lookups. As another example, control server 160 may request statistics for all activity that has occurred for the most recent three days.

At block 240, control server 160 receives statistics from DNS client 114. Block 140 may also involve control server 160 receiving statistics generated by other DNS clients (not depicted).

At block 250, based on the received statistics, control server 160 determines one or more configuration parameters on one or more DNS clients to change. For example, the one or more DNS clients may include DNS clients that are also associated with ISP 130. The one or more DNS clients may include or exclude DNS client 114. Thus, statistics from one set of DNS clients may be used to configure a different set of DNS clients.

Block 250 may involve control server 160 comparing the received statistics to baseline performance data that indicates whether a DNS server or group of DNS servers are performing adequately. For example, a portion of the received statistics may indicate that a particular DNS server from DNS server 132 is associated with a certain number of failed lookups. The baseline performance data may indicate a particular threshold number of failed lookups (or an average number of failed lookups per DNS client), above which if a DNS server is associated with that number, then the DNS server is to be blacklisted or not used, at least for a period of time. In this example, control server 160 compares the actual number of failed lookups with the particular threshold and, if the former is greater than the latter, control server 160 determines that DNS client 114 should not use particular DNS server for DNS lookups.

Other example baseline performance data may indicate an average latency, above which a DNS server or set of DNS servers should be blacklisted or one or more additional DNS servers should be used as default DNS servers.

Configuration parameters may include DNS servers to blacklist, DNS servers to use as default DNS servers, DNS servers to use as fallback DNS servers, a fallback time that indicates when a DNS client is to use one or more fallback DNS servers, time to live (TTL) with respect to a particular DNS client or with respect to a particular DNS server or group of DNS servers, and a rank order that indicates an order in which to query DNS servers.

At block 260, control server 160 sends one or more configuration instructions to the one or more DNS clients, which may include DNS client 114.

Control server 160 may send different configuration parameters to different DNS clients that use the same set of DNS servers. The different configuration parameters may be used for load balancing to prevent all DNS clients in a particular set to query the same DNS server.

Process 200 may be performed continuously to optimize DNS clients, such as DNS clients 114 and 124. After block 260 is performed, control server 160 receives additional information from DNS clients that may be used to configure those DNS clients, which may include the same DNS clients that were configured previously.

In an embodiment, control server 160 determines a number of redirects with respect to a particular DNS client or set of DNS clients (for example, one or more DNS clients that are in the same ISP). Control server 160 may be communicatively coupled to one or more servers that are associated with IP addresses that DNS client 114 and other DNS clients are receiving in response to DNS lookups. Such a server may determine that DNS client 114 should have contacted a different server that is located in a region that is "closer" to DNS client 114 than the region in which the server is located. Based on this determination, the server sends a redirect message to client device 110 to redirect client device 110 to the different server. The server informs control server 160 of this and other "redirects" that the server has performed. In response, for example, control server 160 may determine that a DNS server in a particular ISP is unreliable, mis-configured or otherwise undesirable for use, due to the number of redirects. It may be possible to identify a "misbehaving" DNS server depending on a mapping of an IP address to a given DNS server. However, due to load balancing and anycast technologies, identifying a specific DNS server may be extremely difficult.

In an embodiment, control server 160 sends configuration changes to one or more DNS clients only in response to determining a number of redirects, without first receiving and processing statistics from the one or more DNS clients. In this way, control server 160 does not rely on any logging features of the one or more DNS clients, if such a feature is enabled.

Prefetching

In an embodiment, a DNS client, in response to detecting that an application has started execution, sends one or more DNS resolution requests to one or more DNS servers. If the DNS client sends multiple DNS resolution requests, then each DNS resolution request may be for a different hostname. In this way, the DNS client has a current IP address for each of one or more hostnames even before the application requests an IP address for the one or more hostnames.

A DNS client may determine for which hostnames DNS resolution requests will be sent based on stored configuration data for the application, or based upon which hostnames have been requested by the application in the past. For example, DNS client 114 may send a DNS resolution request for each hostname that application 112 has requested in the past. Instead of sending a DNS resolution request for all hostnames requested in the past, a DNS client may send a DNS resolution request for most frequently requested hostnames (for example, top five most frequently requested hostnames) and/or for most recently requested hostnames (for example, those hostnames that the application has requested in the last day or week). Additionally or alternatively, the DNS client may send a DNS resolution request for the most recently requested, or most frequently requested, hostnames associated with all applications that the DNS client has served over a period of time.

In an embodiment, a DNS client is pre-configured with hostnames whose IP addresses will be pre-fetched. Such pre-configuring is useful in the scenario where it is known prior to installation from which hostnames applications will be requesting data. For example, if a DNS client is to be installed with an application that is installed on a device dedicated to displaying video content and that will be contacting a particular service for video content, then the DNS client may be pre-configured with one or more hostnames associated with the particular service.

Parallel DNS Lookups

A DNS client may be associated with a set of default DNS servers. In one approach, such a DNS client sends a DNS resolution request to a first default DNS server and, if the first default DNS server does not respond within a certain period of time, the DNS client sends the DNS resolution request to a second default DNS server. This approach is referred to herein as the "sequential approach."

In an embodiment, a DNS client sends a DNS resolution request to multiple (for example, default) DNS servers simultaneously. Thus, the DNS client does not wait for one DNS server to respond to a DNS resolution request before sending the same DNS resolution request to another DNS server. In this way, the DNS client receives a DNS response as quickly as possible. If, for example, a third DNS server responded to a DNS resolution request before a first DNS server and a second DNS server who would have been contacted (if at all) before the third DNS server according to the sequential approach, then the DNS client receives the DNS response sooner than the DNS client would have received a DNS response under the sequential approach.

If the DNS client receives multiple responses to a DNS resolution request that is submitted to multiple DNS servers, then the DNS client may ignore the subsequent responses. Alternatively, the DNS client may update the TTL (or expiration time) associated with a cache entry that includes an IP address of the domain name requested in the DNS resolution request.

Also, if one or more subsequent DNS responses indicate a different IP address than the IP address indicated in the first received DNS response, the DNS client may ignore the one or more subsequent DNS responses and update the TTL associated with the appropriate cache entry. Alternatively, the DNS client may update the cache entry with the different IP address.

In an embodiment, the DNS client stores performance data that indicates how certain DNS servers perform relative to one or more DNS resolution requests. Because the DNS client uses multiple DNS servers for DNS lookups, the DNS client generates more performance data than if the DNS client employed the sequential approach.

Performance data may include the (for example, average) time it takes for a DNS server to respond to one or more DNS resolution requests and a number of times a DNS server has not responded to a DNS resolution request within a certain period of time or has responded with an error. With this performance data, the DNS client may determine which DNS servers the DNS client should not send future DNS resolution requests.

In an embodiment, a DNS client treats certain DNS responses differently depending on whether a DNS response is from a default DNS server rather or from a fallback DNS server (or a DNS server outside the client's ISP). For example, if the first response is from a default DNS server, then the first response is immediately; however, if the first response is from a fallback DNS server, then the DNS client waits a particular amount of time before using the first response. The particular amount of time may be a preconfigured amount of time (for example, two seconds) or a time after which all the default DNS servers "timeout."

Cache Refreshing

A DNS client caches DNS responses for a period of time, referred to herein as TTL (or "time to live"). A TTL for cache entries may be, for example, 20 seconds or 60 seconds. Some cache entries may be associated with different TTLs. A cache entry associates a domain name with an IP address. DNS caching allows an application executing on a client device to communicate with a server associated with an IP address without waiting for another DNS lookup to complete. The application may send a domain name resolution request to the DNS client, which first checks a cache to determine whether any entries in the cache indicate a domain name specified in the resolution request. If so, then the DNS client returns a corresponding IP address to the application; otherwise, the DNS client sends a DNS resolution request to a DNS server. However, if the period of time elapses with respect to one or more entries in the cache, then the one or more entries are removed from the cache. If an application needs to communicate with a server associated with a domain name whose IP address is no longer cached, then the application needs to wait for another DNS lookup to be performed.

In an embodiment, a DNS client automatically refreshes a cache entry. In this way, the DNS client does not wait for a request from an application for an IP address for a particular domain name in order to issue a DNS resolution request for the IP address. In other words, a DNS client detects when a cache entry is about to expire or has recently expired. The DNS client may periodically (for example, every 10 seconds) scan entries in the cache for entries that are about to expire or have expired since the last scan. Alternatively, another process may be configured to scan the cache periodically or continuously and inform the DNS client if a cache entry is about to expire or has expired. The other process may inform the DNS client in numerous ways, such as setting a flag that the DNS client periodically checks.

In response to detecting that a cache entry has expired or is about to expire, a DNS client identifies the cache entry and issues one or more DNS resolution requests for the domain name associated with the cache entry. In response to the one or more DNS resolution requests, the DNS client receives one or more responses from one or more DNS servers. The DNS client may update the previously-identified cache entry (and its associated TTL) or create a new cache entry.

In an embodiment, the DNS client may batch multiple DNS resolution requests for refreshing a cache. For example, the DNS client may wait until at least two cache entries are about to expire before performing an automatic refresh. As another example, in response to detecting that one cache entry is about to expire or has expired, the DNS client identifies one or more cache entries that are the nearest to expiring and sends one or more DNS resolution requests for those one or more cache entries in addition to the one cache entry.

In an embodiment, a DNS client refreshes its cache after expiration of a configured time duration regardless of the TTL of individual cache entries. For example, a DNS client refreshes the entire cache every 20 seconds without first checking the TTL associated with any individual cache entries.

In an embodiment, a DNS client effectively ignores a TTL of a cache entry if the TTL is considered too short (e.g., under 30 seconds). In this way, a DNS client does not refresh too often.

Fallback Servers

A DNS client may store data that identifies a set of default DNS servers to which the DNS client sends DNS resolution requests. Such default DNS servers may be provided by the ISP through which the client device receives Internet access.

In an embodiment, a DNS client receives data that identifies additional (for example, public) DNS servers for the DNS client to use. Such data may be received from a control server (for example, control server 160 in FIG. 1) that receives information about multiple DNS servers.

Thus, a DNS client may communicate with both default DNS servers and non-default DNS servers, referred to herein as "fallback servers."

Fallback servers may be used in conjunction with default DNS servers in multiple ways. In one way, a DNS client may be configured to use fallback servers only after determining that the default DNS servers are not working or are relatively slow in responding to DNS requests. If, for example, a default DNS server does not respond to a DNS resolution request after a certain period of time, then the DNS client sends the DNS resolution request to a fallback server.

Another way in which fallback servers may be used is a DNS client issuing a DNS resolution request to a fallback server and to a default DNS server simultaneously. If a fallback server responds to one or more DNS resolution requests faster than a default DNS server, then the DNS client may determine not to send DNS resolution requests to the default DNS server in the future. This may be reflected in server identification data that the DNS client stores and that indicates that the DNS servers identified therein should not be used for DNS lookups, either permanently, for a period of time, or intermittently. For example, the server identification data may indicate that a particular default DNS server is to only be used on every tenth DNS lookup. In this way, the DNS client may discover that the particular default DNS server is performing better and may be used more regularly again.

Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
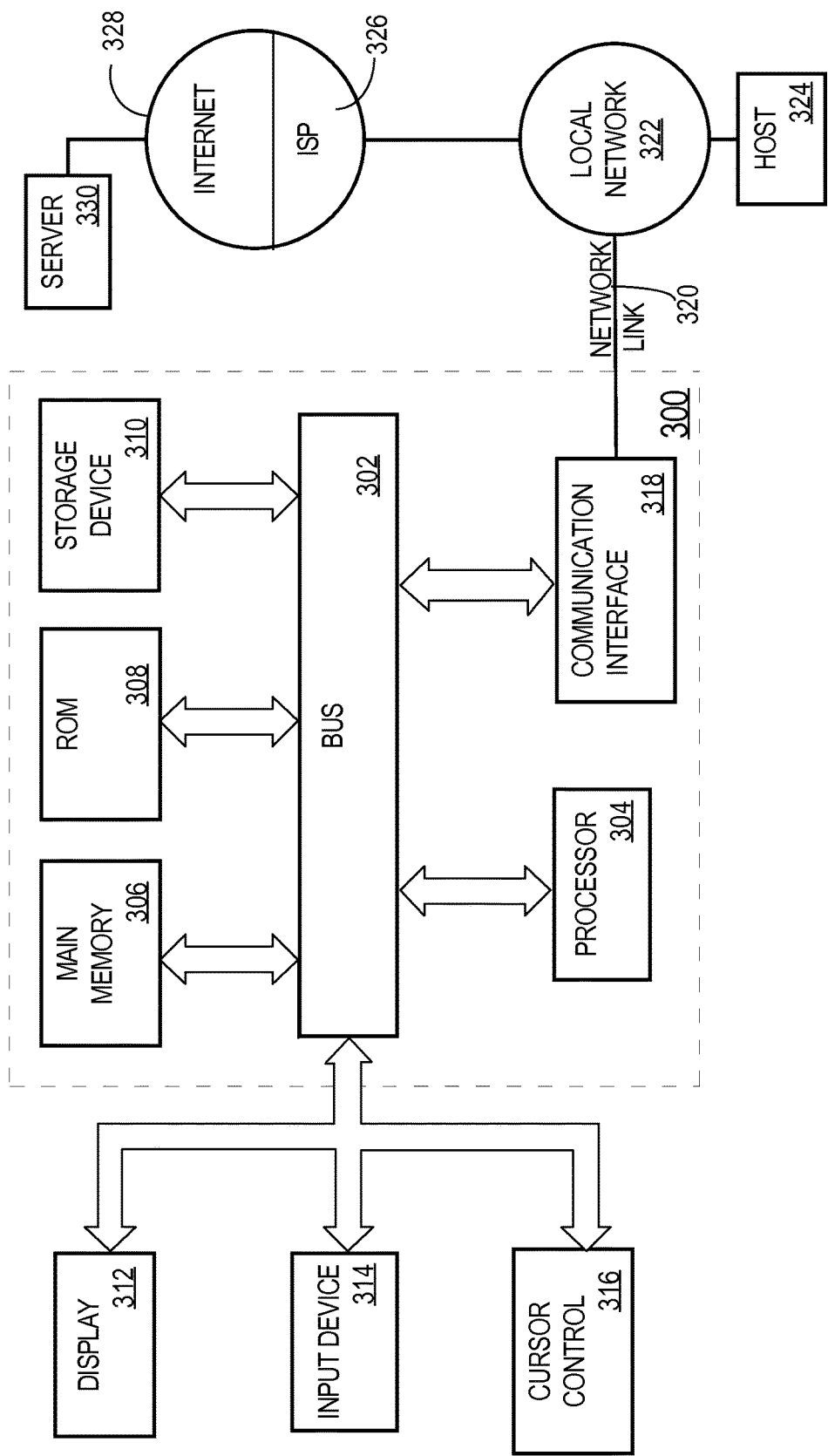
FIG. 3 illustrates a computer system with which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving from one or more DNS clients, at a control server that is remote to the one or more DNS clients that includes a first DNS client, performance data of one or more DNS servers to which the one or more DNS clients send DNS resolution requests, wherein the control server is different from the one or more DNS servers and the one or more DNS clients;
performing an analysis of the performance data;
based at least in part on the analysis of the performance data from the one or more DNS clients that includes the first DNS client, sending, from the control server to a second DNS client that is different from the first DNS client, configuration instructions that, when processed by the second DNS client, causes a configuration of the second DNS client to change;
wherein the method is performed by one or more computing devices.

2. The method of claim 1, wherein:
the configuration instructions include configuration data indicating one or more of (a) a fallback time that indicates when the DNS client is to use one or more fallback DNS servers, (b) a time to live (TTL) with respect to the DNS client or with respect to a particular group of one or more DNS servers, or (c) a rank order that indicates an order in which the DNS client is to query DNS servers.

3. The method of claim 1, wherein none of the performance data is from the second DNS client.

4. The method of claim 1, further comprising:
receiving, from a third DNS client that is different than the first DNS client, second performance data regarding the performance of the one or more DNS servers;
based on the first performance data and the second performance data, sending, to a fourth DNS client, configuration instructions that cause the fourth DNS client to use one or more second DNS servers that are different than the one or more first DNS servers to resolve DNS resolution requests.

5. The method of claim 1, wherein the performance data includes average latency of a plurality of DNS lookups or a number of failed DNS lookups.

6. The method of claim 1, wherein the configuration instructions includes instructions for the second DNS client to avoid one or more third DNS servers that are different than the one or more second DNS servers.

7. The method of claim 1, wherein the configuration instructions includes instructions for the second DNS client to use a DNS server of the one or more second DNS servers.

8. A method comprising:
sending, from a DNS client, one or more DNS resolution requests to one or more DNS servers;
receiving, at the DNS client, one or more responses to the one or more DNS resolution requests;
storing, at the DNS client, based on the one or more responses, performance data regarding the performance of the one or more DNS servers,
sending, from the DNS client, the performance data to a control server that is different than each DNS server of the one or more DNS servers and the DNS client, and receives, from multiple DNS clients, data about the performance of a plurality of DNS servers;
receiving, at the DNS client, configuration instructions from the control server;
changing, at the DNS client, a configuration of the DNS client based on the configuration instructions;
wherein the method is performed by a computing device.

9. The method of claim 8, wherein:
the one or more DNS servers are one or more first DNS servers;
the configuration instructions indicate one or more second DNS servers that are different than the one or more first DNS servers;
changing the configuration includes storing DNS server data that indicates that the one or more second DNS servers are to be used for one or more subsequent DNS resolution requests.

10. The method of claim 8, wherein:
the configuration instructions include configuration data indicating one or more of (a) a fallback time that indicates when the DNS client is to use one or more fallback DNS servers, (b) a time to live (TTL) with respect to the DNS client or with respect to a particular group of one or more DNS servers, or (c) a rank order that indicates an order in which the DNS client is to query DNS servers.

11. The method of claim 8, wherein the performance data indicates one or more (a) a time difference between sending the one or more DNS resolution requests and receiving the one or more responses or (b) an error rate associated with the one or more DNS servers.

12. The method of claim 8, further comprising:
in response to determining that an application has started, sending, from the DNS client, one or more second DNS resolution requests to one or more second DNS servers.

13. The method of claim 8, further comprising:
sending a DNS resolution request to a first DNS server;
sending the DNS resolution request to a second DNS server that is different than the first DNS server without waiting to receive a response to the DNS resolution request from the first DNS server.

14. The method of claim 8, further comprising:
storing, at the DNS client, a plurality of cache entries, each of which associates a hostname with an IP address, wherein each cache entry of the plurality of cache entries is associated with an expiration time;
based on a particular expiration time associated with a particular cache entry, sending, from the DNS client, to a DNS server, a DNS resolution request that indicates a particular hostname that is indicated by the particular cache entry.

15. The method of claim 14, wherein sending the DNS resolution request is performed in response to detecting that the particular expiration time is about to expire or recently expired.

16. The method of claim 8, further comprising:
storing, at the DNS client, first server data that identifies a first set of one or more DNS servers;
storing, at the DNS client, second server data that identifies a second set of one or more DNS servers;
sending, from the DNS client, one or more first DNS resolution requests to one or more DNS servers in the first set;
sending, from the DNS client, one or more subsequent DNS resolution requests to one or more DNS servers in the second set without sending the one or more subsequent DNS resolution requests to any DNS server in the first set.

17. The method of claim 16, further comprising:
  storing, at the DNS client, second performance data regarding the performance of the first set of one or more DNS servers;
  wherein sending the one or more subsequent DNS resolution requests to the one or more DNS servers in the second set is performed based on the second performance data.

18. One or more non-transitory storage media storing instructions which, when executed by one or more processors, cause:
  receiving from one or more DNS clients, at a control server that is remote to the one or more DNS clients that includes a first DNS client, performance data of one or more DNS servers to which the one or more DNS clients send DNS resolution requests, wherein the control server is different from the one or more DNS servers and the one or more DNS clients;
  performing an analysis of the performance data;
  based at least in part on the analysis of the performance data from the one or more DNS clients that includes the first DNS client, sending, from the control server to a second DNS client that is different from the first DNS client, configuration instructions that, when processed by the second DNS client, causes a configuration of the second DNS client to change.

19. The one or more non-transitory storage media of claim 18, wherein determining the performance data comprises:
  the configuration instructions include configuration data indicating one or more of (a) a fallback time that indicates when the DNS client is to use one or more fallback DNS servers, (b) a time to live (TTL) with respect to the DNS client or with respect to a particular group of one or more DNS servers, or (c) a rank order that indicates an order in which the DNS client is to query DNS servers.

20. The one or more non-transitory storage media of claim 18, wherein none of the performance data is from the second DNS client.

21. The one or more non-transitory storage media of claim 18, wherein the instructions, when executed by the one or more processors, further cause:
  receiving, from a third DNS client that is different than the first DNS client, second performance data regarding the performance of the one or more DNS servers;
  based on the first performance data and the second performance data, sending, to a fourth DNS client, configuration instructions that causes the fourth DNS client to use one or more second DNS servers that are different than the one or more first DNS servers to resolve DNS resolution requests.

22. The one or more non-transitory storage media of claim 18, wherein the performance data includes average latency of a plurality of DNS lookups or a number of failed DNS lookups.

23. One or more non-transitory storage media storing instructions which, when executed by one or more processors, cause:
  sending, from a DNS client, one or more DNS resolution requests to one or more DNS servers;
  receiving, at the DNS client, one or more responses to the one or more DNS resolution requests;
  storing, at the DNS client, based on the one or more responses, performance data regarding the performance of the one or more DNS servers,
  sending, from the DNS client, the performance data to a control server that is different than each DNS server of the one or more DNS servers and the DNS client, and receives, from multiple DNS clients, data about the performance of a plurality of DNS servers;
  receiving, at the DNS client, configuration instructions from the control server;
  changing, at the DNS client, a configuration of the DNS client based on the configuration instructions.

24. The one or more non-transitory storage media of claim 23, wherein:
  the one or more DNS servers are one or more first DNS servers;
  the configuration instructions indicate one or more second DNS servers that are different than the one or more first DNS servers;
  changing the configuration includes storing DNS server data that indicates that the one or more second DNS servers are to be used for one or more subsequent DNS resolution requests.

25. The one or more non-transitory storage media of claim 23, wherein:
  the configuration instructions include configuration data indicating one or more of (a) a fallback time that indicates when the DNS client is to use one or more fallback DNS servers, (b) a time to live (TTL) with respect to the DNS client or with respect to a particular group of one or more DNS servers, or (c) a rank order that indicates an order in which the DNS client is to query DNS servers.

26. The one or more non-transitory storage media of claim 23, wherein the performance data indicates one or more (a) a time difference between sending the one or more DNS resolution requests and receiving the one or more responses or (b) an error rate associated with the one or more DNS servers.

27. The one or more non-transitory storage media of claim 23, wherein the instructions, when executed by the one or more processors, further cause:
  in response to determining that an application has started, sending, from the DNS client, one or more second DNS resolution requests to one or more second DNS servers.

28. The one or more non-transitory storage media of claim 23, wherein the instructions, when executed by the one or more processors, further cause:
  sending a DNS resolution request to a first DNS server;
  sending the DNS resolution request to a second DNS server that is different than the first DNS server without waiting to receive a response to the DNS resolution request from the first DNS server.

29. The one or more non-transitory storage media of claim 23, wherein the instructions, when executed by the one or more processors, further cause:
  storing, at the DNS client, a plurality of cache entries, each of which associates a hostname with an IP address, wherein each cache entry of the plurality of cache entries is associated with an expiration time;
  based on a particular expiration time associated with a particular cache entry, sending, from the DNS client, to a DNS server, a DNS resolution request that indicates a particular hostname that is indicated by the particular cache entry.

30. The one or more non-transitory storage media of claim 23, wherein sending the DNS resolution request is performed in response to detecting that the particular expiration time is about to expire or recently expired.

31. The one or more non-transitory storage media of claim 23, wherein the instructions, when executed by the one or more processors, further cause:

storing, at the DNS client, first server data that identifies a first set of one or more DNS servers;

storing, at the DNS client, second server data that identifies a second set of one or more DNS servers;

sending, from the DNS client, one or more first DNS resolution requests to one or more DNS servers in the first set;

sending, from the DNS client, one or more subsequent DNS resolution requests to one or more DNS servers in the second set without sending the one or more subsequent DNS resolution requests to any DNS server in the first set.

32. The one or more non-transitory storage media of claim 31, wherein the instructions, when executed by the one or more processors, further cause:

storing, at the DNS client, second performance data regarding the performance of the first set of one or more DNS servers;

wherein sending the one or more subsequent DNS resolution requests to the one or more DNS servers in the second set is performed based on the second performance data.

\* \* \* \* \*